United States Patent [19]
Richmond

[11] Patent Number: 5,382,948
[45] Date of Patent: Jan. 17, 1995

[54] VEHICULAR SECURITY SYSTEM WITH REMOTE SIGNALLING FOR AUTO CARJACKING FUNCTIONS

[76] Inventor: Henry Richmond, 55 Church St., White Plains, N.Y. 10601

[21] Appl. No.: 72,325

[22] Filed: Jun. 3, 1993

[51] Int. Cl.$^6$ .................. G08B 5/22; B60R 25/10; B60R 25/00; H01H 47/00
[52] U.S. Cl. .................. 340/825.36; 340/825.31; 340/825.54; 340/426; 180/287; 307/10.2; 361/193
[58] Field of Search .................. 340/825.36, 825.31, 340/426, 430, 825.54, 825.83, 825.84; 307/10.2, 10.3, 10.1, 10.4; 180/167, 287, 289; 361/191, 192, 193

[56] References Cited

U.S. PATENT DOCUMENTS

| | | | |
|---|---|---|---|
| 3,160,793 | 12/1964 | Colburn et al. | 361/192 |
| 3,665,312 | 5/1972 | Jarvis . | |
| 3,703,703 | 11/1972 | Payne | 340/426 |
| 3,703,714 | 11/1972 | Andrews | 180/287 |
| 4,023,138 | 5/1977 | Ballin | 180/287 |
| 4,371,052 | 2/1983 | Brandt | 307/10.4 |
| 4,427,929 | 1/1984 | Andrei-Alexandru et al. | 180/289 |
| 4,631,708 | 12/1986 | Wood et al. | 340/825.54 |
| 4,660,528 | 4/1987 | Buck | 307/10.2 |
| 4,686,529 | 8/1987 | Kleefeldt | 340/825.31 |
| 4,709,777 | 12/1987 | Metz | 180/289 |
| 4,841,277 | 6/1989 | Wilson | 340/426 |
| 4,866,433 | 9/1989 | Akutsu | 340/825.31 |
| 4,873,459 | 10/1989 | El Gamal et al. | 340/825.84 |
| 4,881,148 | 11/1989 | Lambropoulos et al. | 307/10.2 |
| 4,942,571 | 7/1990 | Möller et al. | 307/10.1 |
| 4,958,084 | 9/1990 | Carlo et al. | 340/426 |
| 4,973,958 | 11/1990 | Hirano et al. | 307/10.2 |
| 4,987,406 | 1/1991 | Reid | 340/426 |
| 5,049,867 | 9/1991 | Stouffer | 340/426 |
| 5,081,667 | 1/1992 | Drori et al. | 340/426 |
| 5,113,182 | 5/1992 | Suman et al. | 340/825.31 |
| 5,113,427 | 5/1992 | Ryoichi et al. | 180/167 |
| 5,134,392 | 7/1992 | Takeuchi et al. | 340/825.31 |
| 5,194,756 | 3/1993 | Darbesio | 307/10.2 |
| 5,307,048 | 4/1994 | Sanders | 340/426 |

*Primary Examiner*—Donald J. Yusko
*Assistant Examiner*—Mark H. Rinehart
*Attorney, Agent, or Firm*—Natter & Natter

[57] ABSTRACT

A vehicular security system includes an electronic supervisory control unit which communicates with a remote signalling unit to provide both conventional alarm system functions typically associated with securing an unoccupied vehicle as well as anti-carjacking functions. The anti-carjacking functions may be remotely initiated by the vehicle operator who has been forcibly removed from the vehicle or passively initiated and include locking the vehicle doors, closing the vehicle windows, and thereafter disabling the engine to confine a criminal carjacking perpetrator within the vehicle to wait apprehension by law enforcement authorities.

12 Claims, 9 Drawing Sheets

VEHICULAR SECURITY SYSTEM WITH REMOTE SIGNALLING FOR AUTO CARJACKING FUNCTIONS

BACKGROUND OF THE INVENTION

1. Field of the Invention

This invention relates generally to vehicular security systems and more particularly to a security system capable of initiating counteractive action for the apprehension of criminal perpetrators.

2. Related History

The term "carjacking" has been employed to describe the crime wherein the rightful driver and/or occupants of a vehicle have been forced to surrender control of the vehicle under the threat of bodily harm. Statistics have shown an alarming increase in incidents of carjacking. As a deterrent signal recent legislation has been passed by the federal government which provides that the theft of a vehicle through the employment of a gun constitutes a violation of Title 18.

Automotive anti-theft systems heretofore have been primarily designed for the purpose of preventing the theft of unoccupied vehicles. As such, they were configured to, for example, detect unauthorized entry into an unoccupied vehicle by sensing movement, the opening of doors, glass breakage, attempted lifting or towing of a vehicle, etc. and by generating an audible and/or silent alarm.

Other anti-theft devices were configured to inhibit the starting of the vehicle engine by disabling the starter relay and/or disabling the ignition circuit, or preventing the vehicle from being driven by locking the fuel line. Still other devices have been suggested for preventing rotation of the vehicle steering wheel while others have been employed to provide an armor plate around a steering column vehicle ignition lock to deter removal of the lock.

As previously mentioned, however, the prior anti-theft devices were intended to deter theft of an unoccupied vehicle through audible and/or visible signals and/or by disabling the vehicle. Such devices were incapable, however, of functioning as a deterrent to carjacking, which occurred after any of the prior anti-theft systems had been disabled by the authorized driver.

SUMMARY OF THE INVENTION

In compendium, the present invention comprises a vehicular security system wherein an electronic supervisory control unit is mounted within a vehicle and provides both conventional theft deterrent functions as well as anti-carjacking functions designed to both disable the vehicle and detain all unauthorized persons within the vehicle awaiting apprehension by law enforcement authorities who may access a concealed deactivation signal transmitter mounted to the exterior of the vehicle. Thereafter, the vehicle doors may be opened after a time delay has lapsed.

A remote signalling unit communicates with the supervisory control unit through radio frequency and other signalling systems.

The remote unit is of such of size that it can be easily carried about the person of the vehicle operator in a pocket, pinned to clothing, worn as a pendant or wrist watch, beeper, etc. It is significant, however that the remote unit not be attached to the vehicle keys.

In the event the authorized vehicle operator is removed from the vehicle, by an unauthorized person who then takes control of the vehicle, the authorized operator may utilize the remote signalling unit to actuate the supervisory unit which is programmed to interact with a plurality of modules positioned within the vehicle to take appropriate responsive action. The supervisory control unit will disable the vehicle's power door lock control system and lock all doors, disable the vehicle's power window control system and close all windows and thereafter, immobilize the vehicle.

With the perpetrator detained in the immobile vehicle, the supervisory control unit functions to attract law enforcement authorities to the vehicle by an audible annunciator system and/or siren, flashing lights, and an optional radio frequency locator signal.

In the event law enforcement authorities become aware that the vehicle has been stolen with the authorized driver held captive within the vehicle, the supervisory control unit is programmed to respond to an override central station transmitted radio frequency signal and transmit a radio frequency locating signal and/or actuate selected disabling or locating functions.

With these ends in view, it should be appreciated that it is an aspect of the present invention to provide a vehicular security system of the general character described which is not subject to the disadvantages of the related history aforementioned.

It is a feature of the present invention to provide a vehicular security system of the general character described which is capable of furnishing appropriate responses to various carjacking situations.

A consideration of the present invention is to provide a vehicular security system of the general character described which is readily adaptable for retrofit installation in existing vehicles.

Another aspect of the present invention is to provide a vehicular security system of the general character described which can be remotely activated by a carjacking victim at a safe distance from the perpetrator.

Yet another aspect of the present invention is to provide a vehicular security system of the general character described capable of implementing effective counteractive measures against carjacking in situations wherein a carjacking victim is held captive within a vehicle.

To provide a vehicular security system of the general character described which self activates when configured in a passive mode is yet a further aspect of the present invention.

A further consideration of the present invention is to provide a vehicular security system of the general character described which is relatively low in cost and is suitable for economical mass production fabrication.

With these ends in view, the invention finds embodiment in certain combinations of elements, arrangements of parts and series of steps by which the said aspects, features and considerations and certain other aspects, features and considerations are hereinafter attained, all as more fully described with reference to the accompanying drawings and the scope of which is more particularly pointed out and indicated in the appended claims.

BRIEF DESCRIPTION OF THE DRAWINGS

In the accompanying drawing, in which is shown some of the various possible exemplary embodiments of the invention.

DESCRIPTION OF THE PREFERRED EMBODIMENTS

Figure 1:
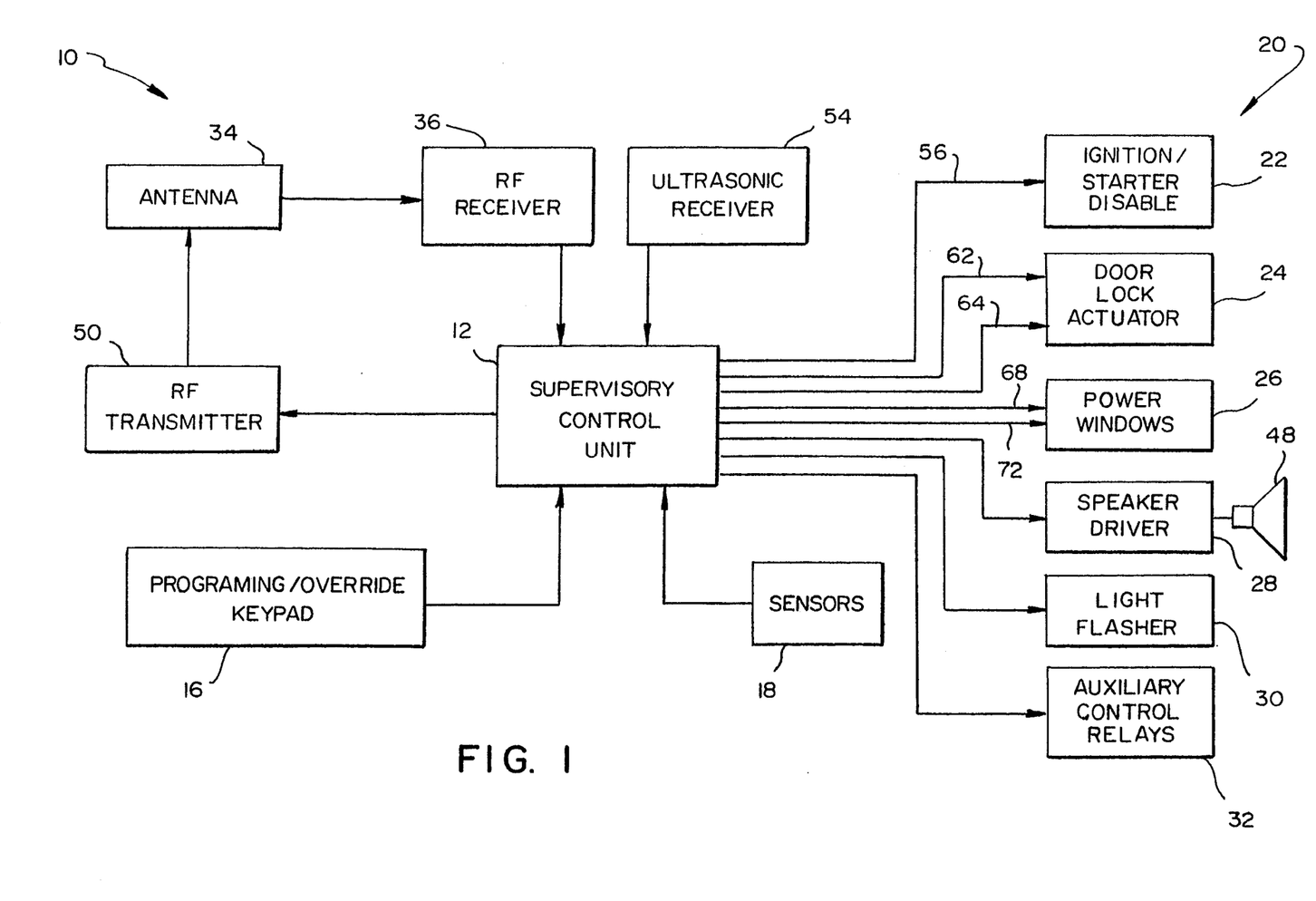
FIG. 1 is a schematized diagram illustrating the components of a vehicular anti-theft system constructed in accordance with and embodying the invention, including a supervisory control unit.

Referring now in detail to the drawings, the reference numeral 10 denotes generally a vehicular security system constructed in accordance and embodying the invention. The security system 10 comprises an electronic supervisory control unit 12, mounted in a concealed location within a motor vehicle. The supervisory control unit 12 is configured for communication with a miniature remote signalling unit 14.

As will be observed from FIG. 1, the supervisory control unit 12 is operatively connected to a keypad 16 for user programming including override functions. Such programing may include selection of available options such as entry exit delay timing, remote operation of door locks, annunciator warnings, siren, light flasher etc. A plurality of sensors 18 are operatively connected to the supervisory control unit 12. The sensors may include conventional alarm type sensors such as door switches, hood switches, current sensors, proximity switches, microwave detectors, level sensors (to detect jacking), infra red sensors, motion detectors, etc.

Selected system alarm responses are actuated by signals from the supervisory control unit 12 to an array of interfaced slave modules 20. The modules 20 are operatively positioned at various locations through the vehicle and with each adapted to serve a dedicated function. Among the modules 20 are an ignition and starter relay disable module 22, a door lock actuator module 24, a power window actuator module 26, a speaker driver module 28, a light flasher module 30 and an auxiliary control relay module 32.

An antenna 34 and radio frequency receiver 36 are operatively connected to the supervisory control unit 12 for receiving communication signals from the remote signalling unit 14. RF signal communication between the remote signalling unit 14 and the supervisory unit 12 are be provided for customary alarm signal functions such as arming/disarming, opening and closing door locks interior lights etc. as well as for providing anticarjacking alarm functions.

Communication between the supervisory control unit 12 and the remote signalling unit 14 is preferably provided by digitally coded RF signalling which permits a complex series of commands to be encoded within a substantially smaller frequency bandwidth than would be possible with analog RF signalling. Further, digitally coded signals are less sensitive to electromagnetic interference than analog signals. Additionally, due to the unique codes which may be provided through digital coding, the triggering of false alarms and the opportunity for signal piracy is substantially reduced.

Figures 2, 3:
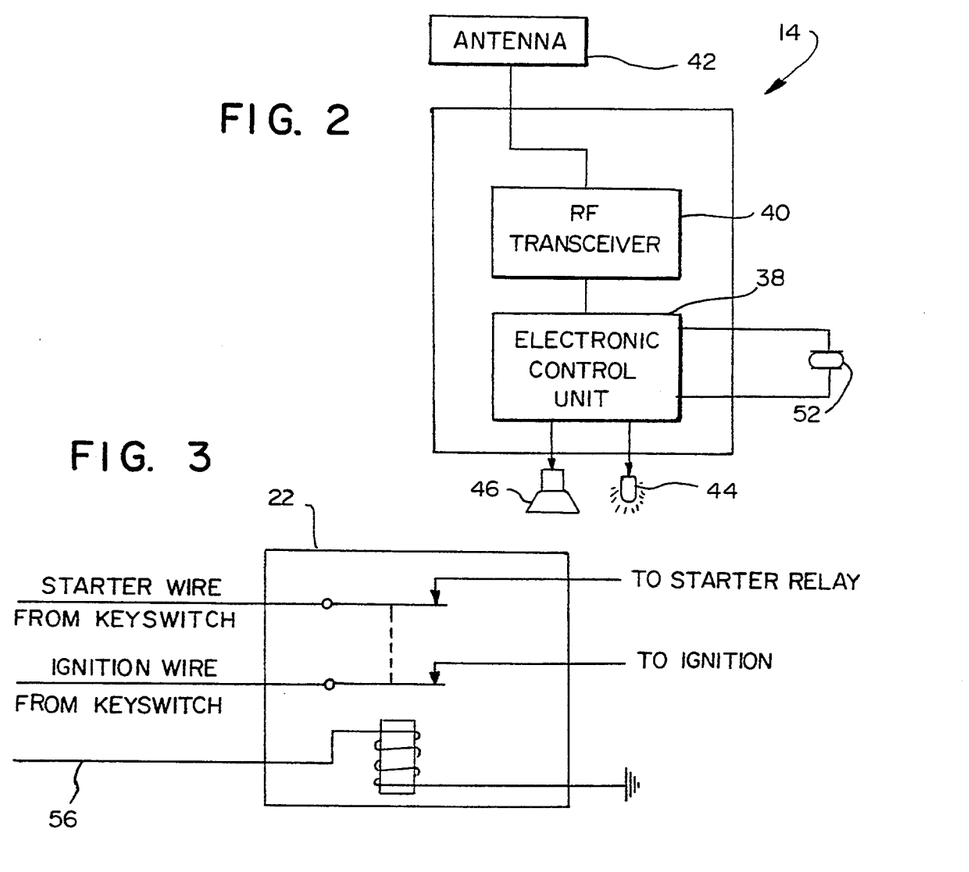
FIG. 2 is a schematized illustration of a remote signalling unit which communicates with the supervisory control unit.
FIG. 3 is a schematized illustration of an ignition and starter disable module which is controlled by the supervisory control unit.

Referring now to FIG. 2 wherein the remote signalling unit 14 is illustrated, the remote signalling unit 14 may include an electronic control unit 38, an RF transceiver 40 and an antenna 42. Additionally, a light emitting diode 44 may be provided for visual indication that a signal is being transmitted and/or that the battery strength is adequate. The remote signalling unit 14 may also include a miniature speaker 46 which will provide an audible sound such as a chirp to indicate acknowledgment of completion of a signal transmission, or advise of the status of the supervisory control unit, etc.

A speaker 48 is operatively connected to the speaker driver module 28 within the vehicle for the purpose of providing an acknowledgment signal such as a chirp to indicate that the supervisory control unit is armed/disarmed or to provide other audible response signals as well as intruder warning notices and siren functions.

The supervisory control unit 12 is also configured for passive arming by polling the remote signalling unit 14 and awaiting a response signal. For this purpose, an RF transmitter 50 is operatively connected to the supervisory control unit and the transmitter 50 is, in turn, connected to the antenna 34. The antenna 42 of the remote signalling unit receives the polling request signal from the supervisory control unit. The signal passes through the RF transceiver 40 and is received at the electronic control unit 38. The electronic control unit then generates an appropriate response signal.

Rather than employ an RF response signal, the electronic control unit 38 drives an ultrasonic emitter 52 to generate an ultrasonic response signal. When remote signalling unit 14 is within the cabin of the vehicle, the ultrasonic response signal will be received at an ultrasonic receiver 54 which is connected to the supervisory control unit 12. Since the signal generated by the ultrasonic emitter 52 is of limited range, when the signalling unit 14 is not within the cabin of the vehicle, the ultrasonic signal will not be received by the receiver 54 and the supervisory control unit will arm itself automatically upon exit of the remote signalling unit 14 from the vehicle, if programmed in a passive mode through the keypad 16.

The keypad 16 may be employed to program the supervisory control unit to recognize only certain of the sensors 18 and which of the modules 20 will be actuated under specific circumstances and in which sequence the modules will be actuated. For example, when an operator leaves the vehicle, the unit 12 may be programmed to assure that the windows will close and the doors will automatically lock.

The keypad 16 may be also utilized to program the speaker driver 28 to provide certain announcements prior to an attempted break in including warning announcements and or a siren. Additionally, the keypad 16 may be employed to program the supervisory control units to appropriately actuate the light flashing module 30.

With reference now to FIG. 3 wherein the ignition and starter disable module 22 is shown in greater detail, it will observed that the module 22 comprises a double pole single throw normally closed relay. One set of relay contact is series connected with the starter wire line which runs from the key switch to the starter relay. The other set of relay contacts is series connected in the ignition wire line from the key switch to the vehicle ignition system. A relay coil is actuated by the supervisory unit along a control line 56 and when actuated, functions to open both sets of relay contacts to stall the vehicle and prevent the starter motor from engaging.

In diesel engine powered vehicles which have no ignition system, the auxiliary control module 32 may be connected to a solenoid operated fuel line lock for the purpose of disabling the engine.

Figure 4:
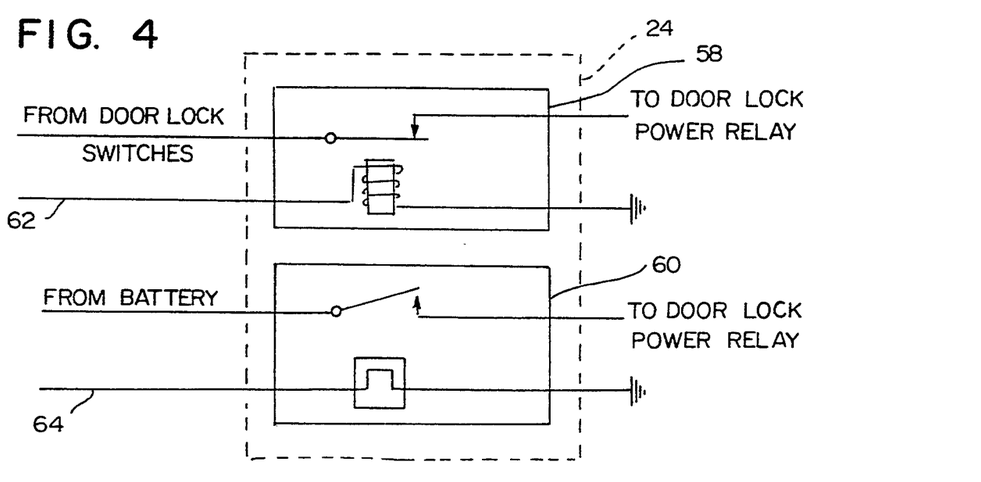
FIG. 4 is a schematized illustration of a vehicle door lock actuator module which is under the control of the supervisory control unit.

Shown in FIG. 4 is a typical door lock actuator module 24. The module 24 comprises a pair of relays, 58, 60. The relay 58 is a single pole single throw normally closed relay, the contacts of which are series positioned between the vehicle door lock switches and the vehicle door lock power relay. A relay coil is actuated by the supervisory control unit along a control line 62 and when actuated, opens the circuit to prevent the door lock switches from functioning. The second relay 60 is a single shot normally open relay, the contacts of which are series connected from the vehicle battery or other power supply source and the door lock power relay. The relay 60 is actuated to close its contacts, upon an appropriate signal from the supervisory control unit along a control line 64 which energizes a single shot coil to momentarily supply current to the power door lock relay, causing the doors to lock.

Figure 5:
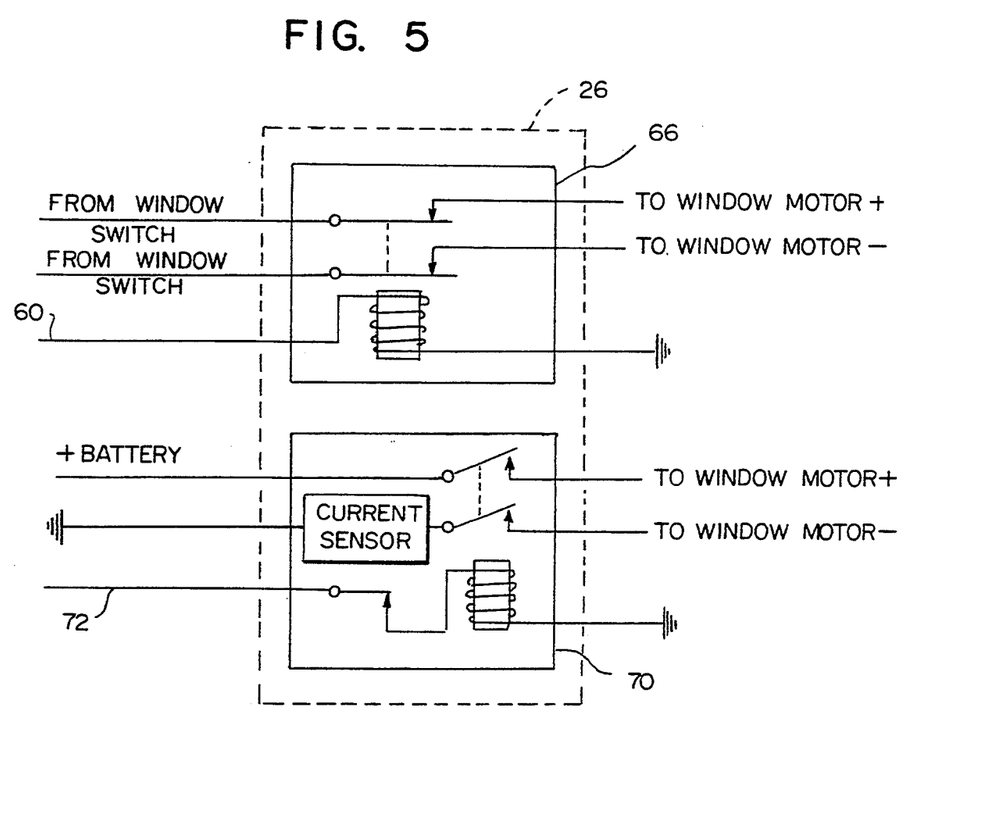
FIG. 5 is a schematized illustration of a power window actuator module which is under the control of the supervisory control unit.

The power window actuator module 26 is depicted in FIG. 5. Such module comprises a first double pole single throw normally closed relay 66 which functions to disable the vehicle power window actuator switches. The one set of contacts of the relay is positioned between each window switch and the leads to the associated power window motor and a coil of the window 66 is actuated by the supervisory control unit along a control line 68. When actuated, the relay 66 opens the circuit between the power window switches and the associated motor. The power window actuator module 26 includes a second double pole single throw normally open relay 70 associated with each power window motor, for applying power to close the associated power window and with a current sensor shut off when the windows are fully closed and the associated motor begins excessive current draw. One set of contacts of the relay 70 is series connected between the positive battery supply and the power window motor and another set of contacts is series connected between the negative or ground potential and the power window motor with the second or return line including a current sensor. The current sensor is configured to detect excessive current drain and open a further set of contacts which are series connected between the supervisory control unit control line 72 and a coil of the relay 70.

Figure 6:
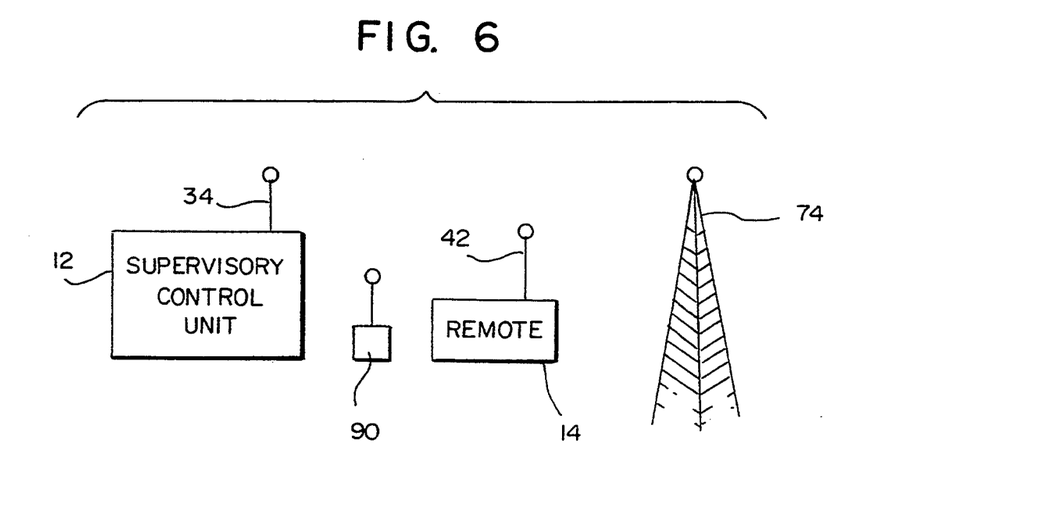
FIG. 6 is a schematized illustration of the supervisory control unit receiving signals from either the remote signalling unit or a central station transmitter.

In the event of a carjacking wherein the authorized vehicle operator is held captive within the vehicle, it is possible for the police authorities, upon learning of the incident, to utilize a central station transmitter 74 illustrated in FIG. 6, for the RF transmission of an appropriate signal, which, when received by the supervisory control unit 12 will commence actuation of a preselected series of actions for the purpose of signalling the location of the vehicle to the law enforcement authorities. Such signalling can be accomplished through an RF locating signal transmission through the antenna 34. Additionally, in the event of vehicle pursuit by law enforcement authorities, the law enforcement authorities may request the transmission of additional RF signals to the supervisory control unit for the purpose of disabling the vehicle, thus enabling apprehension of the perpetrator.

An alternate embodiment of the invention utilizes an alternate signal transmission system between the supervisory control unit 12 and the individual modules 20. Pursuant to the alternate embodiment of the invention, the supervisory control unit 12 employs an indirect interface and generates, through a multiplexer, a small amplitude alternating current signal encoded for control of specific desired modules. The alternating current signal is applied over the direct current wiring circuit which extends throughout the vehicle.

Figure 7:
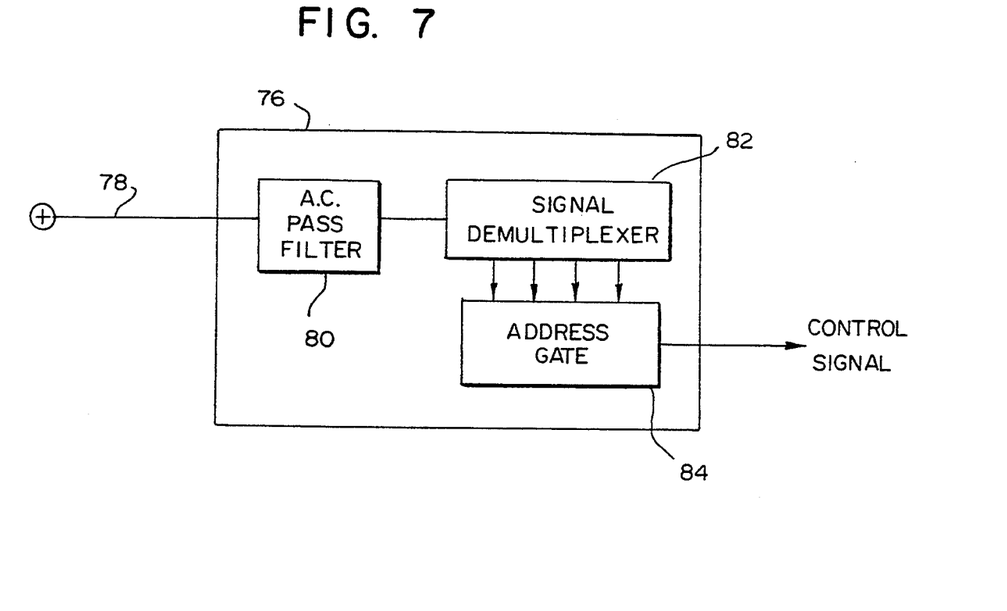
FIG. 7 is a schematized illustration of an alternate embodiment of a typical module which is indirectly interfaced with the supervisory control unit through digitally encoded signals modulated over the direct current wiring of the vehicle.

Associated with each module is a decoding module 76, depicted in FIG. 7. The decoding module 76 includes an input line 78 which taps into any vehicle circuit wire connected to the positive battery terminal and which is in the proximity of the specific module 20 to be controlled. The decoding module 76 includes an A.C. pass filter 80 which filters the alternating current signal from the line.

The filtered signal is then fed to a signal demultiplexer 82. The demultiplexed signal is transmitted to an address gate 84 for the particular module. At the address gate 84, a determination is made as to whether or not the demultiplexed signal includes a control signal for the particular assigned module and if so the gate 84 outputs a control line signal for the particular module.

Figure 8:
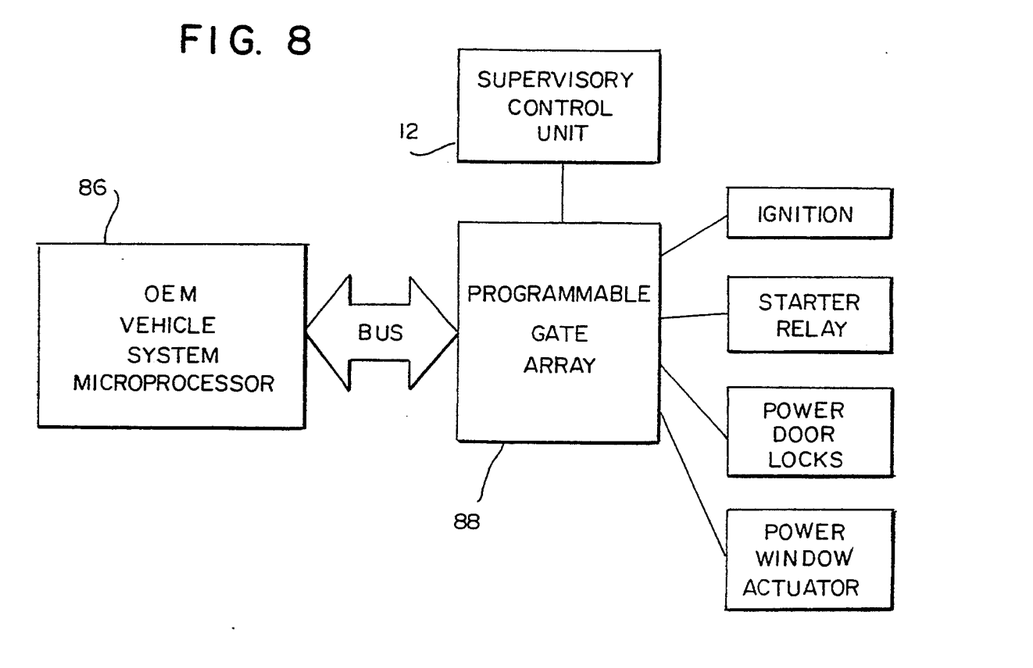
FIG. 8 is a schematized illustration of an alternate embodiment whereby the supervisory control unit overrides accessory communication with an OEM vehicle system microprocessor through a programmable gate array.

In instances wherein the vehicle ignition system, starter relay as well as door locks, power windows and other accessories are under the control of a central OEM vehicle system microprocessor 86, individual modules 20 are not required and the supervisory control unit 12 may be indirectly interfaced between the OEM central microprocessor 86 and the vehicle ignition system, starter relay and accessories such as power window motors and door lock actuators through a programmable gate array 88, as illustrated in FIG. 8. The programmable gate array 88 intercepts and modifies signals to and/or from the bus of the OEM microprocessor to effect the desired Vehicular Security System function in accordance with the present invention.

Deactivation of the system after an alarm sequence has been activated and the doors and windows are locked may be accomplished by law enforcement authorities who access a deactivation signal transmitter 90 carried in a normally inaccessible location on the outside of the vehicle, preferably behind an access plate on the vehicle undercarriage. The deactivation signal initiates a time delay counter which is set for an appropriate delay period before the supervisory control unit deactivates.

Figure 9:
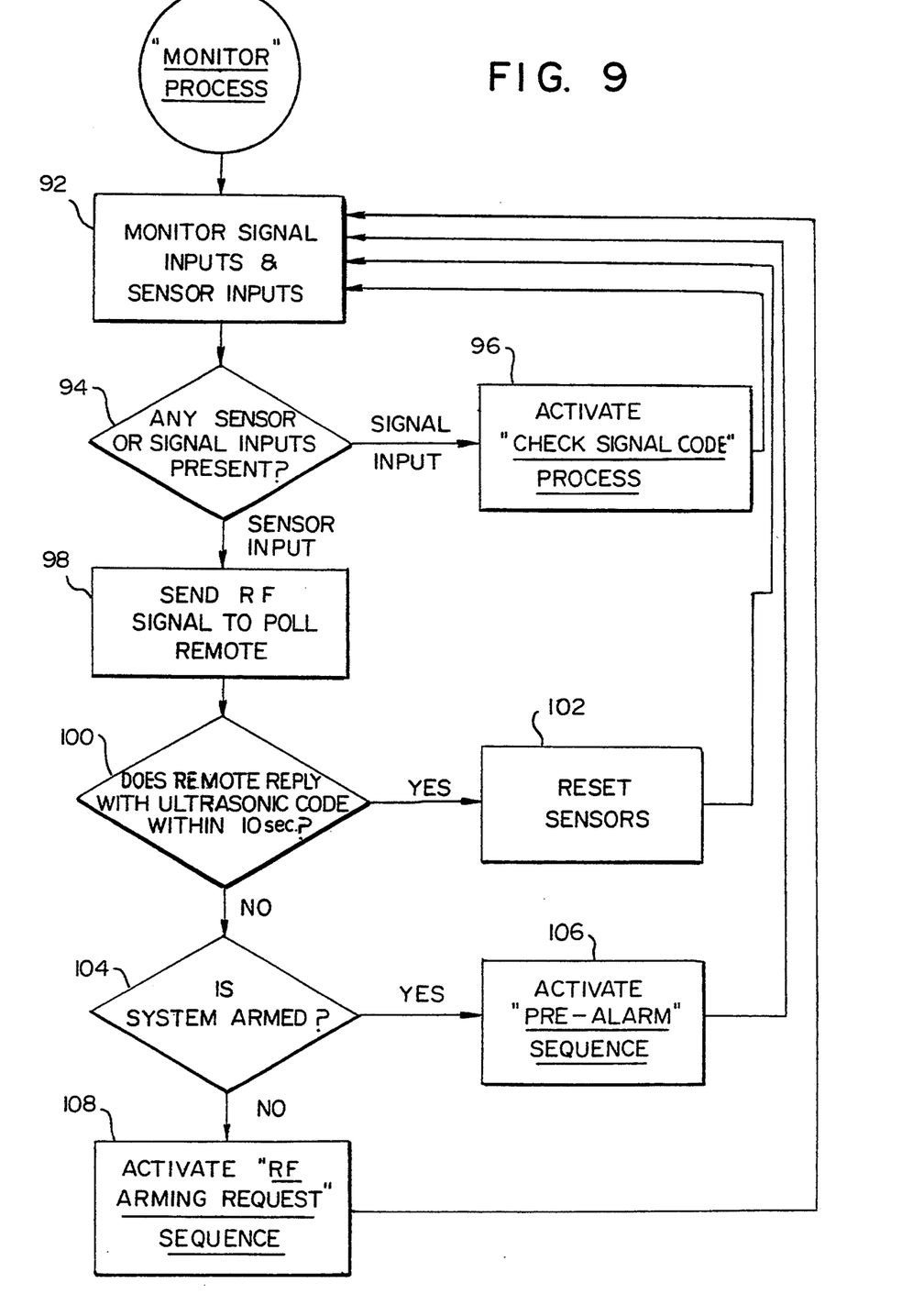
FIG. 9 is a flow chart depicting a standby or monitor process of the supervisory control unit.
Figure 10:
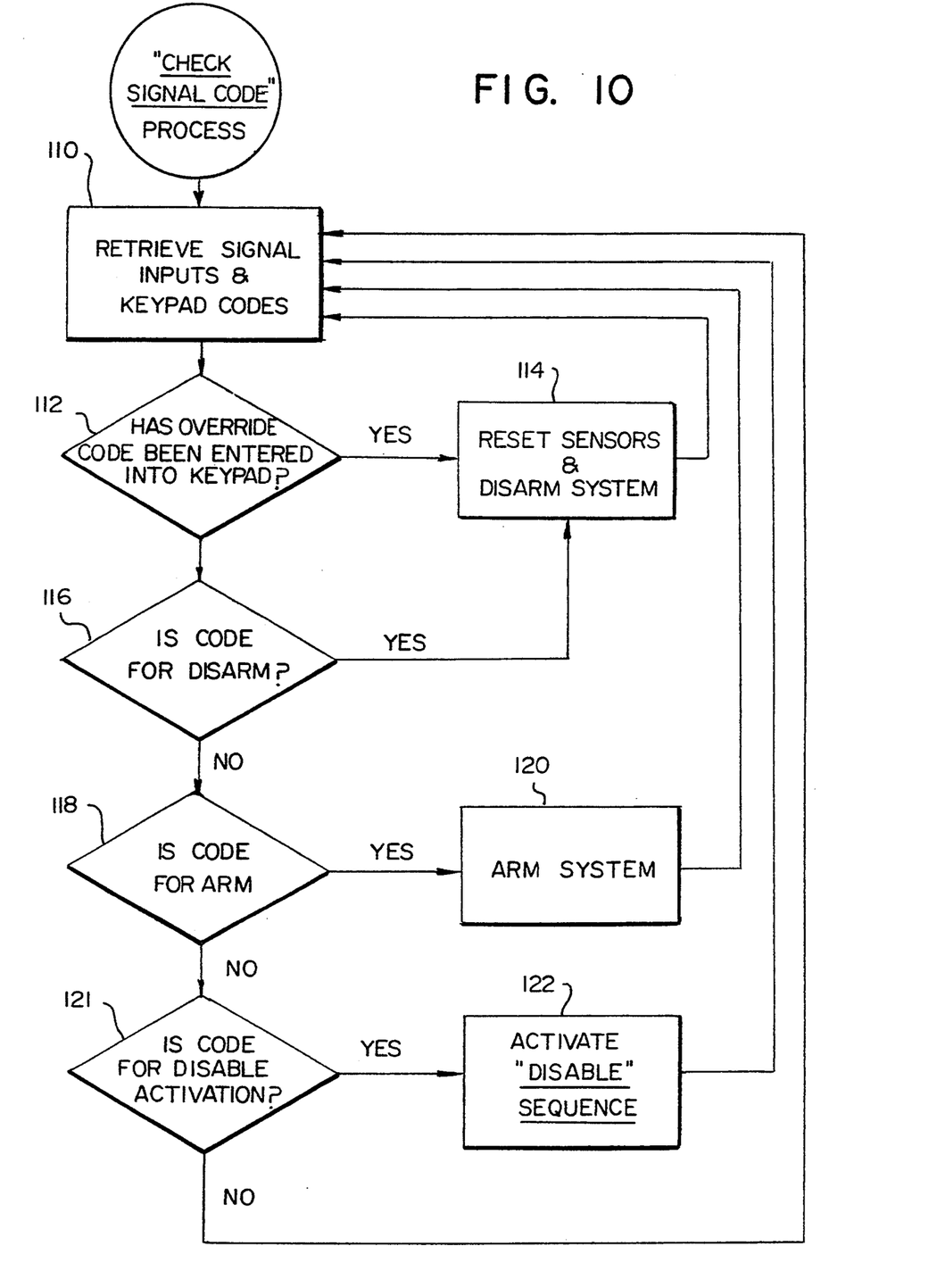
FIG. 10 is a flow chart depicting a check signal code process of the supervisory control unit.

A typical flow chart for a supervisory control unit standby or monitor status process is depicted in FIG. 9 and a typical flow chart for a supervisory control unit check signal code process is depicted in FIG. 10. In the monitor process, the supervisory control unit monitors signal inputs and the inputs from the sensors 18 as indicated in block 92. Thereafter, an inquiry is made as to the presence of sensor or signal inputs as indicated in a decision block 94.

In the event signal inputs are detected, the supervisory control unit enters into the activate check signal process as indicated in a block 96. In the event sensor inputs are present, an RF signal is transmitted to poll the remote unit 14 as indicated at a block 98. Thereafter, the supervisory control unit determines whether or not the remote replied with an ultrasonic signal within, for example, ten seconds, as indicated in a decision block 100. If a timely ultrasonic reply signal is received, the sensors are reset as indicated in block 102, while if a timely ultrasonic reply is not received, an inquiry is made as to whether or not the system is armed as indicated in a block 104.

If the system is armed, the supervisory control unit enters into the activate pre-alarm sequence as indicated in a block 106 while if the system is not armed, the supervisory control unit enters into the activate RF arming request sequence as indicated in a block 108.

When the supervisory control unit enters into the check signal process, depicted in FIG. 10, the control unit initially retrieves the signal inputs and keypad input codes as indicated in a block 110 and thereafter determines whether or not an override code was entered through the keypad as indicated in a decision block 112. If an override code was entered, the supervisory control unit resets the sensors and disarms the system as indicated in a block 114 and returns to the block 110. If no override has been entered through the keypad, an inquiry is made as to whether or not a disarm keypad code has been entered as indicated in a block 116. If such keypad code is present, the supervisory control unit proceeds to reset the sensors and disarm the system as indicated in the block 114 and returns to the block 110, while if there is no code entered for disarming, a further inquiry is made as to whether or not a keypad code has been entered for arming the system as indicated at a block 118.

If an arming code has been entered, the supervisory control unit proceeds to arm the system as indicated in a block 120 and returns to the block 110. If there is no arming code present, the supervisory control unit then proceeds to then inquire as to whether or not a code has been entered for disabling activation as indicated in an inquiry block 121. If a disable code has been entered, the supervisory control unit proceeds to initiate a disable sequence subroutine as indicated at a block 122 and returns to the block 110, while if no disable code has been entered, the supervisory control unit returns to the initial check signal code process step, block 110.

Figure 11:
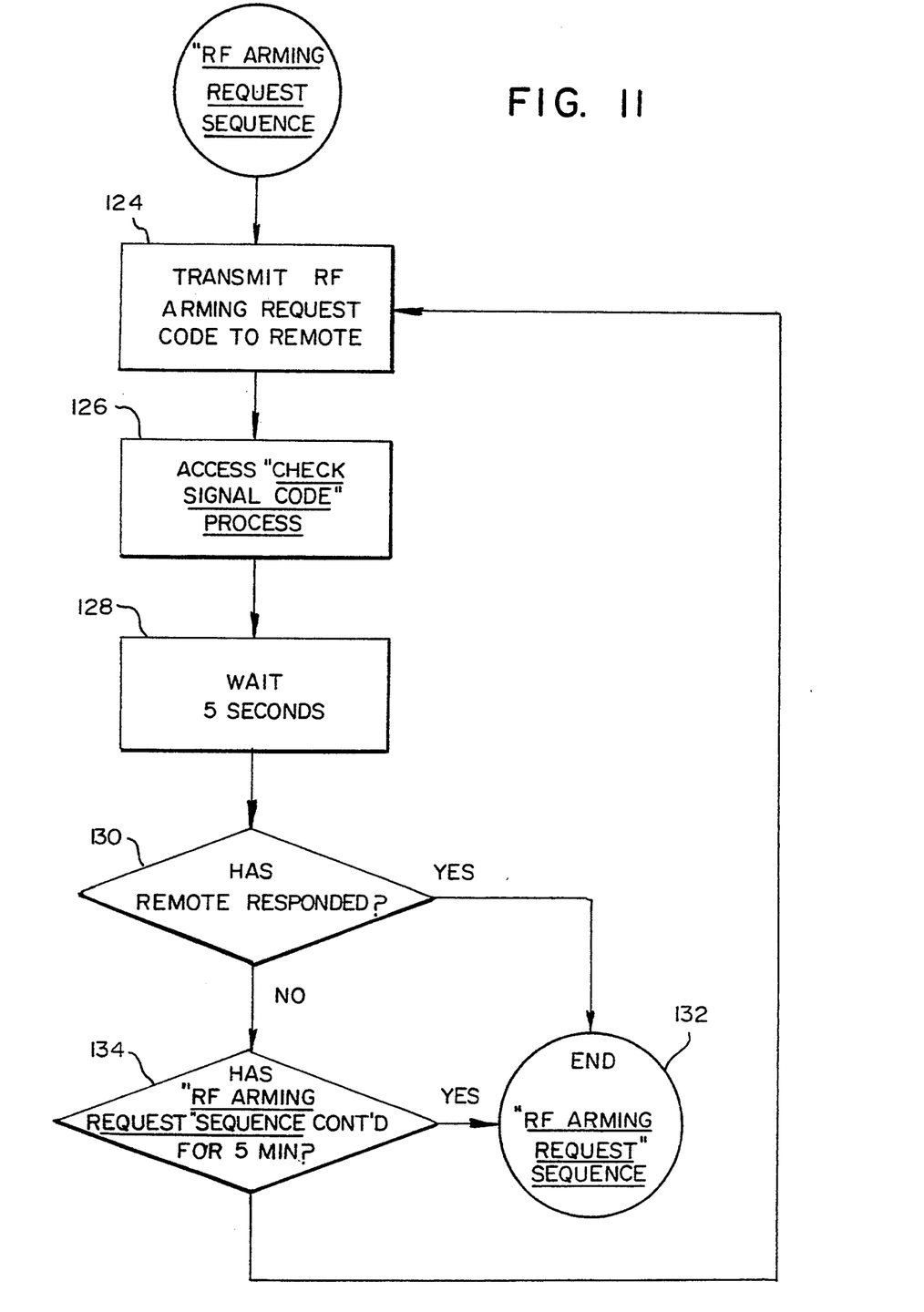
FIG. 11 is a flow chart of a supervisory control unit sequence for monitoring the remote signalling unit.

Illustrated in FIG. 11 are the steps of the RF arming request sequence of the supervisory control unit. Upon entering the sequence, the supervisory control unit transmits a RF arming request code to the remote unit as indicated in a block 124. Thereafter, the supervisory control unit accesses the check signal code process as indicated in a block 126, then enters into a five second delay as indicated in a block 128. After the five second delay, the supervisory control unit inquires as to whether or not a response has been received from the remote unit, as indicated in an inquiry block 130. If the remote has responded, the arming request sequence thereafter terminates as indicated in a block 132 while if no response is received, an inquiry is made as to whether or not the arming request sequence has continued for five minutes, as indicated in a block 134, if not, the arming request sequence cycles back to the block 124.

Figure 12:
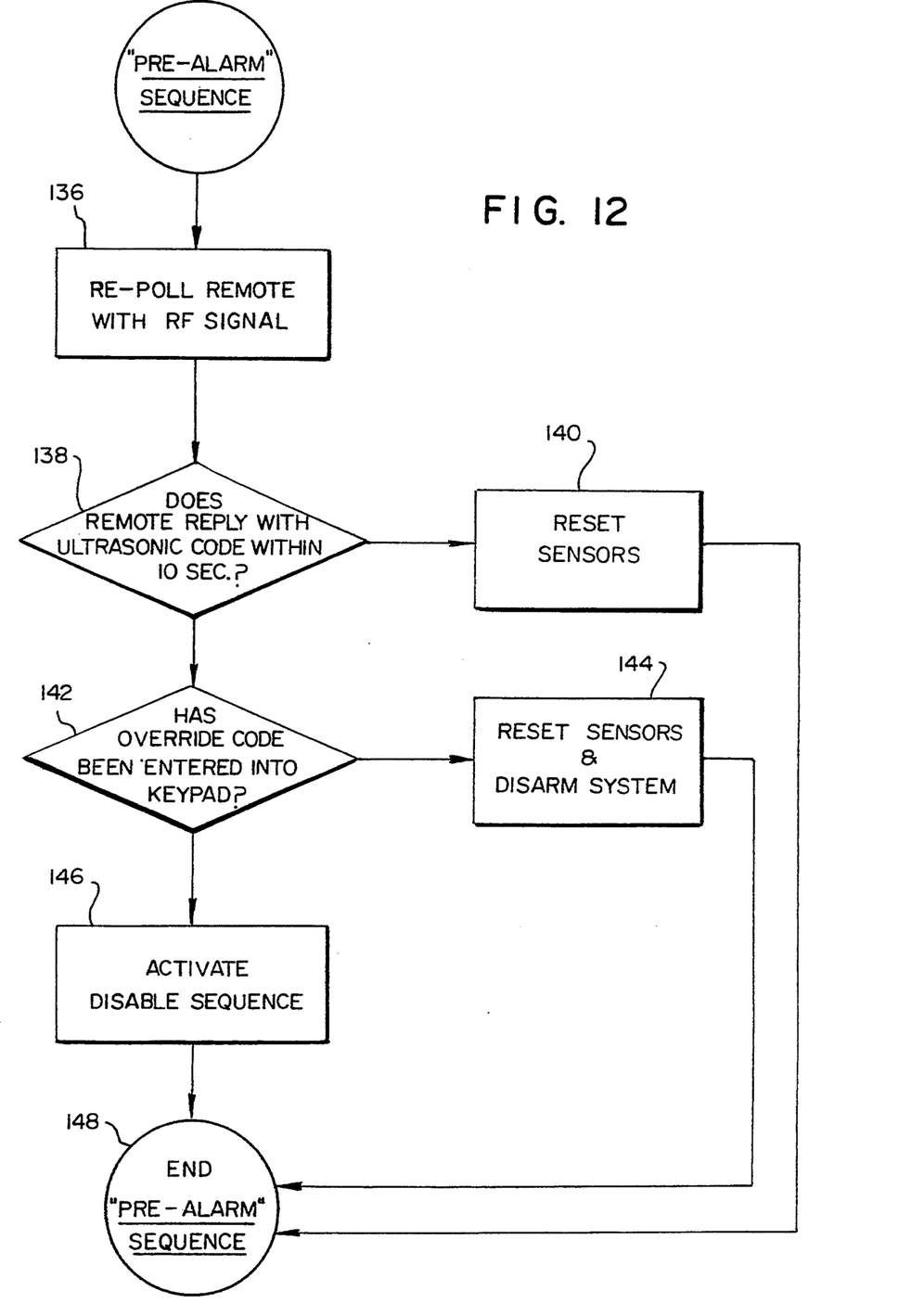
FIG. 12 is a flow chart of a sequence for passive alarm activation.

FIG. 12 illustrates a flow chart of a programmed pre-alarm sequence for the supervisory control unit. Upon entering the sequence, the supervisory control unit repolls the remote unit with a RF signal as indicated in a block 136. Thereafter, inquiry is made as to whether or not an ultrasonic code signal reply has been received from the remote unit within ten seconds as indicated in an inquiry block 138. If a timely response was received, the supervisory control unit thereafter resets the sensors as indicated in a block 140 and proceeds to end the pre-alarm sequence as indicated at 148.

Figure 13:
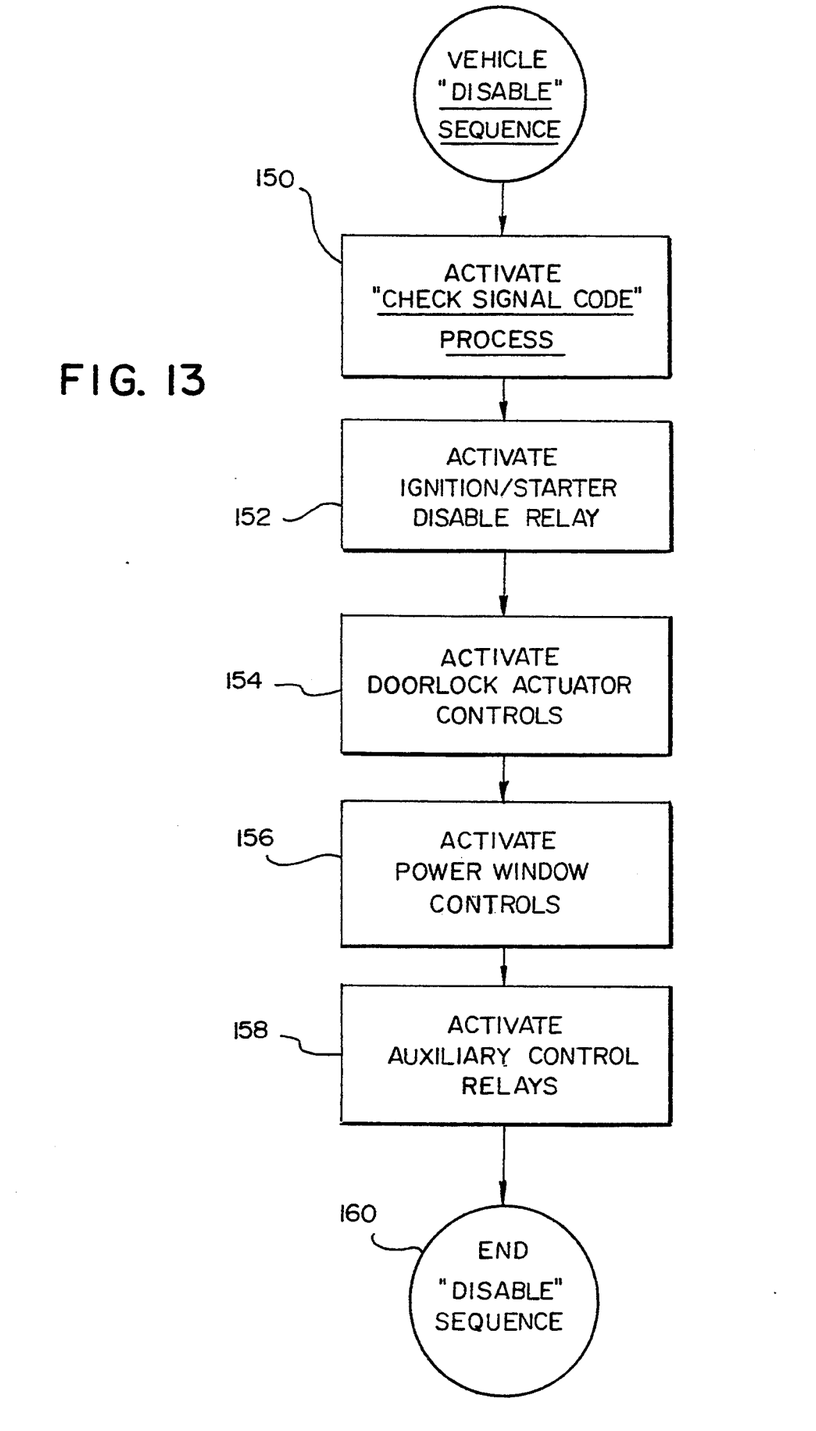
FIG. 13 is a flow chart of a vehicle disable sequence.

If there has been no timely ultrasonic code reply, the supervisory control unit proceeds to a further inquiry as to whether or not an override code has been entered through the keypad, as indicated in an inquiry block 142. If an override code is present, the supervisory control unit thereafter resets the sensors and disarms the system as indicated in a block 144 and proceeds to end the pre-alarm sequence as indicated in 148. If there has been no override code entered through the keypad, the supervisory control unit proceeds to activate the disable sequence as indicated in a block 146 and thereafter ends the pre-alarm sequence as indicated at 148. FIG. 13 there is illustrated a flow chart of a typical vehicle disable sequence. In the disable sequence, the supervisory control unit initially activates the check signal code process as indicated in a block 150 and thereafter activates the ignition and/or starter disable relay as indicated in a block 52. The supervisory control unit then proceeds to activate the door lock actuator control as indicated in a block 154, followed by activation of the power window control as indicated in a block 156 and finally, activates the auxiliary control relays as indicated in a block 158. After proceeding through the final step of activating the auxiliary control relays, the supervisory control unit ends the disable sequence routine as illustrated at 160.

The supervisory control unit 12 may comprise any suitable controller, by way of example, an INTEL microcontroller chip such as an 8031, 8051 or 8096 or a MOTOROLA microcontroller chip such as 68HC11 or 68332 together with appropriate memory and interfacing.

Thus it will be seen that there is provided a vehicular security system which achieves the various aspects, features and considerations of the present invention and which is well adapted to meet the conditions of practical usage.

As various changes might be made in the exemplary embodiments above described and shown without departing from the spirit of the invention and as various changes might be made in the embodiment set forth, it is to be understood that all matter herein described or shown in the accompanying drawings is be interpreted as illustrative and not in a limiting sense.

Having thus described the invention, there is claimed as new and desired to be secured by Letters Patent:

1. A vehicular security system-for recovery of a vehicle from an unauthorized person who has obtained possession of the vehicle by removing an authorized operator from the vehicle, the security system comprising a supervisory control unit carried within the vehicle, a remote signalling unit, the remote signalling unit being dimensioned so as to be and being inconspicuously carried by the authorized operator, the remote signalling unit and the supervisory control unit having means for effecting wireless communication therebetween, the vehicle having power door locks including a locking mechanism associated with each door and a control switch connected to each door locking mechanism, whereby each door locking mechanism is actuatable from a door unlocked positioned to a door locked position and from a door locked position to a door unlocked position responsive to actuation of the control switch, the vehicle having power windows including at least one power window motor operably connected to a movable window and at least one window control switch connected to each power window motor, whereby each movable window operably connected to a power window motor is actuated from a window open position to a window closed position or positions therebetween and from a window closed position to a window open position or positions therebetween in response to actuation of the window control switch, the security system further including power door lock interface means in communication with the supervisory control unit, the power door lock interface means for interrupting ,the connection between the power door lock control switch and each door locking mechanism, the power door lock interface means including means for actuating all power door locking mechanisms to the door locked position, the security system further including power window interface means in communication with the supervisory control unit, the power window interface means for interrupting the connection between each window control switch and its associated power window motor, the power window interface means including means for actuating the power window motor to move its associated operably connected window to the window closed position, the supervisory control unit being programmed to actuate the power window interface and the power door lock interface in response to wireless communication signalling between the supervisory control unit and the remote signalling unit after the authorized operator carrying the remote signalling unit has been removed from the vehicle.

2. A vehicular security system as constructed in accordance with claim 1 for recovery of a vehicle from an unauthorized person who has obtained possession of the vehicle by removing an authorized operator from the vehicle, the authorized operator carrying the remote signalling unit, wherein the means for interrupting the connection between the power door lock control switch and each door locking mechanism comprises first door lock relay means for opening the connection between the power door lock switch and each door locking mechanism and the means for actuating all power door locking mechanisms to the door locked position comprises second door lock relay means, the second door lock relay means being connected between a voltage supply and each door locking mechanism.

3. A vehicular security system as constructed in accordance with claim 2 for recovery of a vehicle from an unauthorized person who has obtained possession of the vehicle by removing, from the vehicle, an authorized operator carrying the remote signalling means wherein the means for interrupting the connection between the window control switch and its associated power window motor comprises first power window relay means and the means for actuating the power window motor to the window closed position comprises second power window relay means, the second power window relay means being connected between a voltage supply and the power window motor, the connection being of a polarity for actuating the motor in a direction to move the associated window to the closed position.

4. A vehicular security system as constructed in accordance with claim 2 for recovery of a vehicle from an unauthorized person who has obtained possession of the vehicle by removing, from the vehicle, an authorized operator carrying the remote signalling unit wherein the means for interrupting the connection between the power window control switch and its associated power window motor comprises first power window relay means and the means for actuating the power window motor to move its associated operably connected window to the window closed position comprises second power window relay means, the second power window relay means being connected between a voltage supply and the power window motor, the connection being of a polarity for actuating the motor in a direction to move the associated window to the closed position.

5. A vehicular security system as constructed in accordance with claim 1 for recovery of a vehicle from an unauthorized person who has obtained possession of the vehicle by removing, from the vehicle, an authorized operator carrying the remote signalling unit wherein the vehicle includes a motive system, the motive system including an engine having an ignition system and means operatively connecting the ignition system to an operator key switch, the security system further including ignition disabling means for interrupting the connection between the key switch and the ignition system, the supervisory control unit being programmed to actuate the ignition disabling means in response to wireless communication signalling between the supervisory control unit and the remote signalling unit after the authorized operator carrying the remote signalling unit has been removed from the vehicle.

6. A vehicular security system as constructed in accordance with claim 1 for recovery of a vehicle from an unauthorized person who has obtained possession of the vehicle by removing from the vehicle, an authorized operator carrying the remote signalling unit, the vehicle further including a motive system, the motive system having a starter motor actuated by a starter relay and means interconnecting the starter relay to an operator key switch, the vehicular security system further including means for interrupting the connection between the key switch and the starter relay, the connection interrupting means including relay means positioned between the key switch and the starter relay, the supervisory control unit being programmed to actuate the relay means in response to wireless communication signalling between the supervisory control unit and the remote signalling unit after the authorized operator carrying the remote signalling unit has been removed from the vehicle.

7. A vehicular security system as constructed in accordance with claim 1 for recovery of a vehicle from an unauthorized person who has obtained possession of the vehicle by removing, from the vehicle, an authorized operator carrying the remote signalling unit wherein the means for effecting wireless communication includes ultrasonic transmitting means associated with the remote signalling unit and ultrasonic receiving means associated with the supervisory control unit, ultrasonic signals generated by the ultrasonic signal transmitting means being received by the ultrasonic signal receiving means only when the remote signalling unit is within the vehicle, the supervisory control unit being programmed to actuate the power window interface and the power door lock interface in the absence of the ultrasonic signal whereby the vehicular security system is automatically actuated when an authorized operator carrying the remote signalling unit is removed from the vehicle.

8. A vehicular security system for recovery of a vehicle from an unauthorized person who has obtained possession of the vehicle by removing an authorized operator from the vehicle, the security system comprising a supervisory control unit carried within the vehicle, a remote signalling unit, the remote signalling unit being dimensioned so as to be inconspicuously carried by the authorized operator, the remote signalling unit and the supervisory control unit having means for effecting wireless communication therebetween, the vehicle having power door locks including door locking mechanisms and windows connected to window motors, the power door locks and the window motors being controlled by a processor, the vehicular security system including a programmable gate array in communication with the supervisory control unit interfaced between the processor and the door locking mechanisms and interfaced between the processor and the window motors, the programmable gate array including means for interrupting processor control over the door locking mechanisms and the window motors and means for actuating the door locking mechanisms to a locked position and for actuating the window motors to close all windows in response to wireless communication signalling between the supervisory control unit and the remote signalling unit after the authorized operator carrying the remote signalling unit has been removed from the vehicle.

9. A vehicular security system constructed in accordance with claim 8 for recovery of a vehicle from an unauthorized person who has obtained possession of the vehicle by removing, from the vehicle, an authorized operator carrying the remote signalling unit, wherein the vehicle includes motive means under the control of the processor, the programmable gate array including means for interrupting the control of the motive means by the microprocessor and for disabling the motive means in response to wireless communication signalling between the supervisory control unit and the remote signalling unit after the authorized operator carrying the remote signalling unit has been removed from the vehicle.

10. A method of recovering a vehicle from an unauthorized person who has obtained possession of the vehicle by removing, from the vehicle, an authorized operator, the method comprising the steps of:
  (a) detecting an alarm condition indicating that the authorized operator is no longer in the vehicle by monitoring the status of wireless communication signals transmitted by a remote signalling unit in the possession of the authorized operator;
  (b) preventing the unauthorized person from exiting the vehicle through vehicle doors by locking all vehicle doors and disabling all door unlocking controls;
  (c) preventing the unauthorized person from exiting the vehicle through any windows by closing all open windows and disabling all window opening controls; and
  (d) disabling the vehicle from operating.

11. A method of recovering a vehicle from an unauthorized person who has obtained possession of the vehicle by removing, from the vehicle, an authorized operator in accordance with claim 10, the method further including the step of:
  (e) signalling the location of the disabled vehicle by radio frequency transmission.

12. A method of recovering a vehicle from an unauthorized person who has obtained possession of the vehicle by removing, from the vehicle, an authorized operator in accordance with claim 10 further including the step of:
  (e) signalling the location of the disabled vehicle by generating an audible signal.

* * * * *